June 29, 1937.    R. LAPSLEY    2,085,322
TRANSMISSION FOR TRUCKS
Filed May 2, 1934    5 Sheets-Sheet 1

Inventor:
Robert Lapsley
By Brown, Jackson, Boettcher & Dienner
Attys

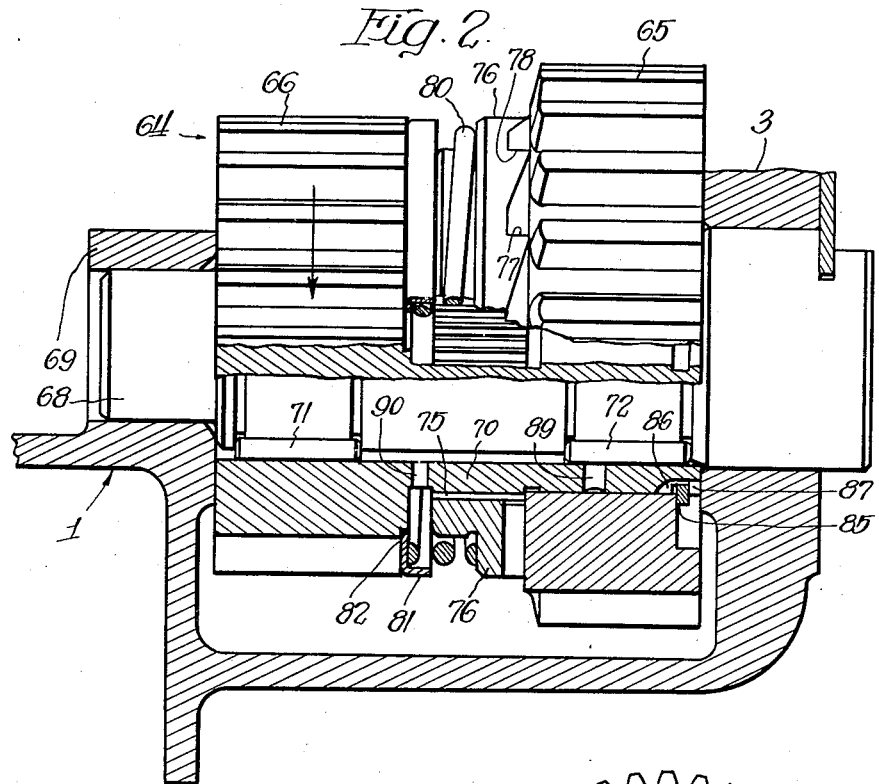
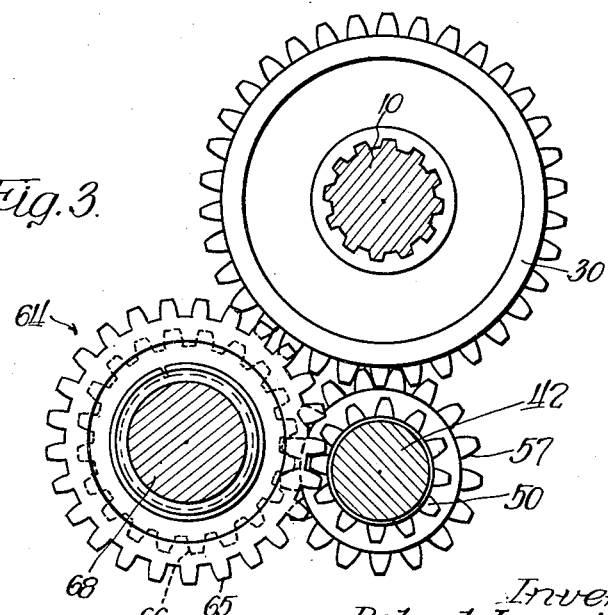

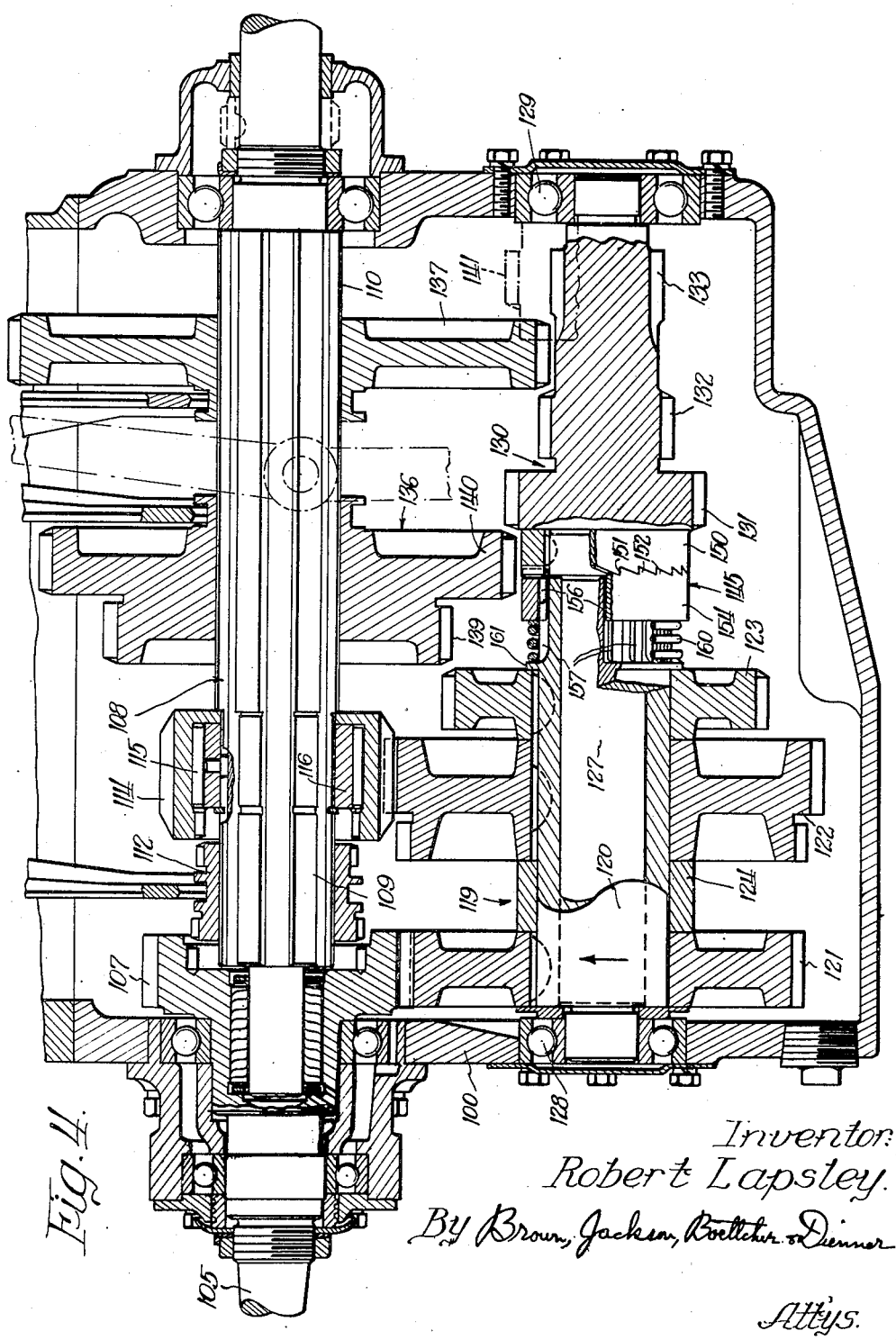

June 29, 1937.    R. LAPSLEY    2,085,322
TRANSMISSION FOR TRUCKS
Filed May 2, 1934    5 Sheets-Sheet 4

Inventor:
Robert Lapsley.
By Brown, Jackson, Boettcher & Dienner,
Attys.

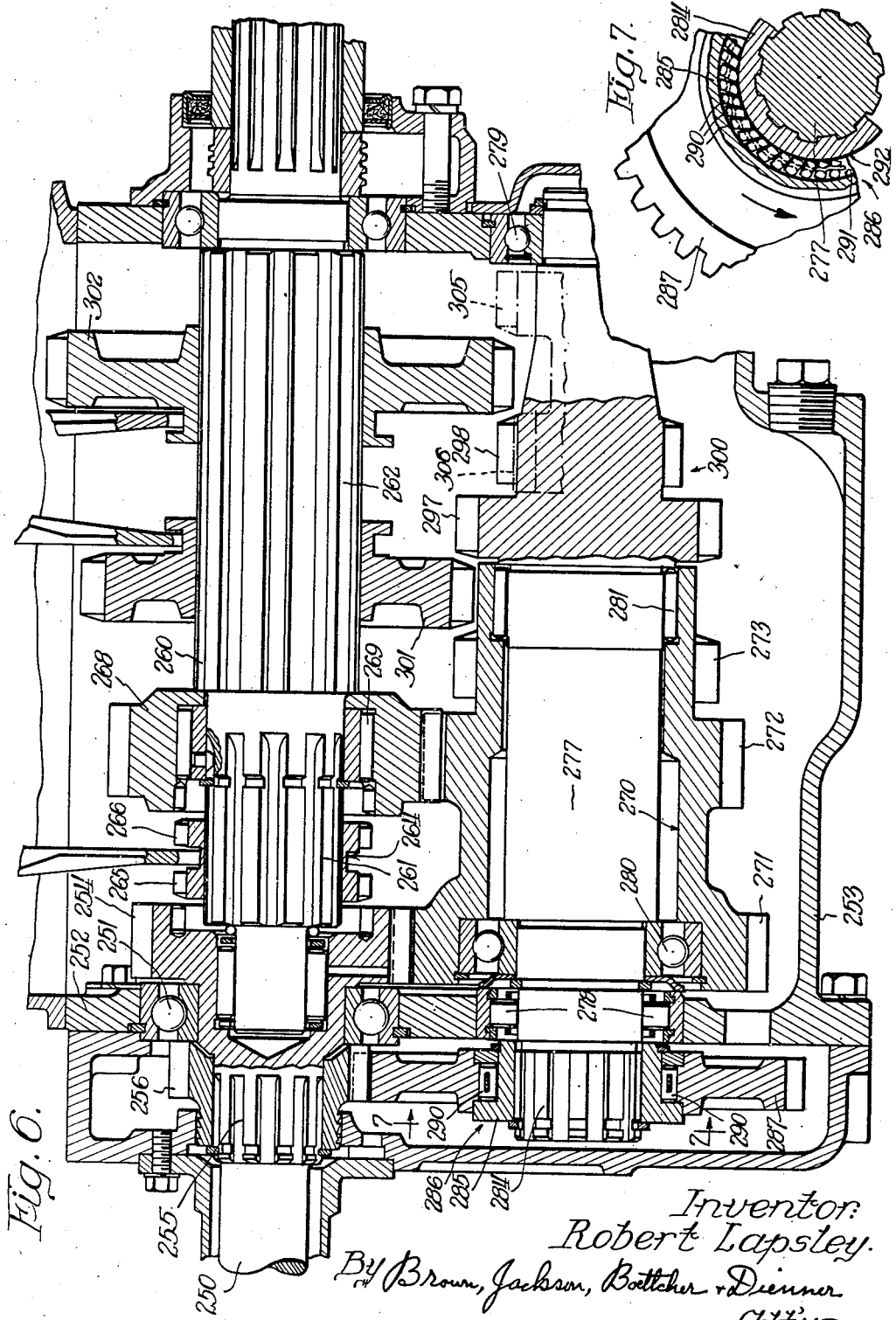

Patented June 29, 1937

2,085,322

UNITED STATES PATENT OFFICE 2,085,322

TRANSMISSION FOR TRUCKS

Robert Lapsley, Berrien Springs, Mich., assignor to Clark Equipment Company, Buchanan, Mich., a corporation of Michigan Application May 2, 1934, Serial No. 723,450

13 Claims. (Cl. 74—333)

The present invention relates generally to transmissions for automotive vehicles and the like, and is particularly concerned with the provision of a new and improved heavy duty transmission for trucks, buses and the like, and particularly for vehicles employing four and five forward speed transmissions.

In transmissions for heavy vehicles, such as trucks, buses and the like, and especially where four and five speeds forward are provided, the three high speeds are arranged with gear ratios which are suitable for using the motor as a brake or to hold back the vehicle when going down hill. At the present time practically all of such transmissions now in use have their gear ratios so proportioned. For example, in many of the four speed transmissions with which I am familiar, second, third and fourth speeds are so proportioned that when any of these gear ratios are engaged and the motor used to retard the speed of the vehicle, the motor will not be driven by the momentum of the vehicle at a dangerously excessive rate. Similarly in many of the five speed transmissions with which I am familiar, the third, fourth and fifth speeds are proportioned in a similar manner.

In such transmissions, however, the lower gear ratios, that is, the low or first speed in four speed transmissions, and the first and second speed in five speed transmissions, afford such gear reductions so very low that the motor should not be used as a brake since, by virtue of the excessively great gear reduction, the motor would be driven by the momentum of the vehicle at so great a rate that the crank shaft bearings and other parts of the motor would be damaged.

With the above factors in mind, one of the principal objects of the present invention is the provision of a change speed gear mechanism affording a plurality of gear reduction ratios and the division of such ratios into two groups, according to whether or not it is desirable to prevent the transmission of the reaction of the load upon the power source, and the interposition of means, preferably entirely out of the control of the operator, for preventing the transmission of the load reaction upon the power source when the load reaction would otherwise tend to drive the power source at an excessive rate of speed or under conditions where such would be undesirable.

More specifically, another object of the present invention is the provision of a transmission of the type embodying four or five speeds forward in which certain of the gear ratios available are such that the motor can be used as a brake and other gear ratios are so proportioned that the motor should not be used as a brake, in connection with a simple and inexpensive overrunning clutch device associated with the gear reduction means affording the gear ratios in which the motor should not be used as a brake. The utilization of an overrunning clutch for this group of gear ratios forms a very simple and successful means for protecting the motor in that, according to the principles of the present invention, it is not possible to utilize the motor as a brake under conditions where the motor should not be so used. However, the use of the motor as a brake under conditions where that function is possible and desirable is not affected.

More specifically, an object of the present invention is the provision of a four speed forward transmission in which the motor can be used as a brake in second, third and fourth speeds but cannot be used as a brake when the low speed is engaged.

Likewise an object of the present invention is the provision of a five speed forward transmission in which the motor can be used as a brake only when third, fourth and fifth speeds are engaged, an overrunning device associated only with the first and second speeds serving to prevent the utilization of the motor as a brake when these low ratios are employed.

Still further, another object of the present invention is the provision of an overrunning clutch device associated with those relatively low speeds in which gear changing in truck transmissions and the like is relatively difficult. For example, I have found that the greatest replacement of the lower gear parts has been due to chipping or wearing off of the ends of the gear teeth due to the excessive gear clashing which occurs, due principally to the fact that, in such transmissions employing four and five speeds forward, the lower ratios are so widely spaced and the component parts are so massive that gear changing is rendered difficult. The provision of an overrunning clutch associated only with those relatively low gear ratios in which gear changing is difficult, effectively overcomes such objections while, at the same time, the possibility of using the motor as a brake in the higher gear ratios where it is desirable is retained.

These and other objects of the present invention will be apparent to those skilled in the art after a consideration of the following detailed description of the preferred structural embodiments of my invention, taken in conjunction with the accompanying drawings illustrating such embodiments.

In the drawings:

Figure 2 is a sectional view taken along the line 2—2 of Figure 1, showing the details of the overrunning clutch device and associated connections;

Figure 3 is a view taken along the line 3—3 of Figure 1;

Figure 4 is a sectional view of a conventional five speed transmission, embodying five forward speeds and one reverse, and in which an overrunning clutch device has been provided for first and second speeds and reverse drive only;

Figure 6 is another type of five speed transmission in which the overrunning clutch device is operatively associated with the gear reduction means for first, second and reverse speeds; and Figure 7 is a fragmentary section taken at an enlarged scale along the line 7—7 of Figure 6 with certain parts broken away.

Figure 1:
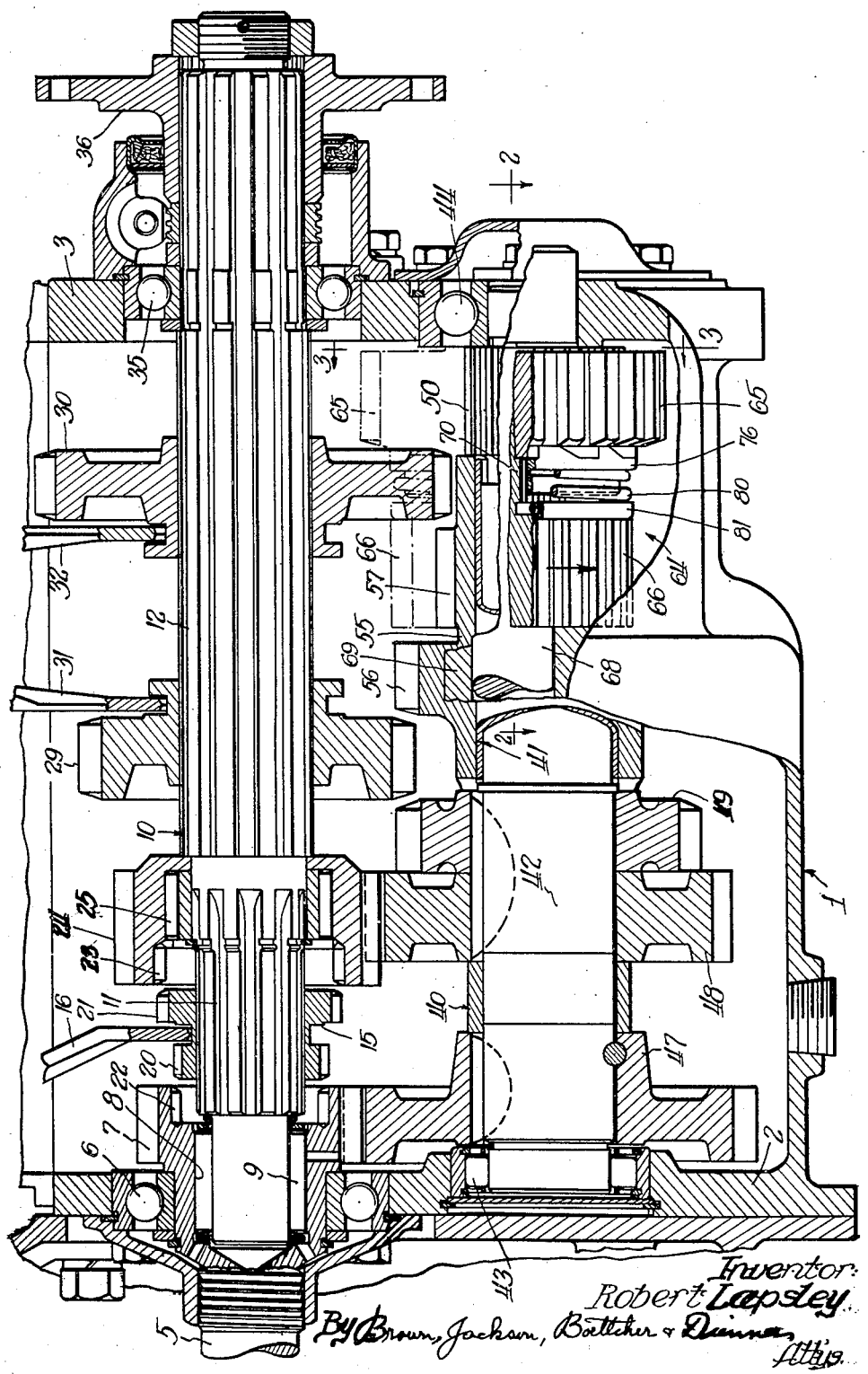
Figure 1 is a vertical section taken through a transmission of the five speed type embodying five forward speeds and one reverse and in which an overrunning clutch device has been provided to prevent the momentum of the vehicle from driving the motor when first and second speeds forward are engaged.

Referring now more particularly to Figures 1, 2 and 3, the transmission illustrated comprises a main transmission housing 1 having a front wall 2 and a rear wall 3 in which the countershafts and the driving and driven shafts are journaled. The driving shaft is indicated by the reference numeral 5 and is supported by bearings 6 in the front wall 2 of the casing and includes a driving gear 7 which has a suitable recess 8 to receive bearing means 9 by which the forward end of the driven shaft 10 is piloted. The driven shaft 10 is splined in two sections 11 and 12, the forward splined section 11 being of smaller diameter than the section 12 and having slidably mounted thereon a clutch dog 15 controlled by a shift fork 16 of the usual construction. The shiftable hub member or clutch dog 15 is equipped with two sets of teeth 20 and 21 engageable, respectively, with teeth 22 formed on the driving gear 7 and teeth 23 carried by a gear member 24 which is rotatably mounted, as by suitable bearing means 25, on the driven shaft 10 between the splined sections 11 and 12. Slidable gears 29 and 30 are mounted on the splined section 12 and are controlled, respectively, by shift forks 31 and 32 for securing various gear ratios, as will be referred to later. The rear end of the driven shaft 10 is provided with bearing means 35 carried by the rear wall of the transmission housing for supporting the driven shaft, and a suitable driving flange 36 is secured to the rear end of the driven shaft 10 and serves as a part of the means connecting the driven shaft 10 with the propeller shaft of the vehicle.

Two countershafts 40 and 41 are journaled for rotation in the lower portion of the transmission housing 1, and each is in the form of a compound gear or similar member having two or more gear sections of different diameters to secure different driving ratios. The first countershaft 40 includes a shaft section 42 journaled by bearing means 43 in the front wall 2 of the transmission housing and by bearing means 44 in the rear wall 3 of the transmission housing. Gears 47, 48 and 49 are rigidly secured to the shaft section 42, as by keys or the equivalent, and the larger gear 47 is arranged to be in constant mesh with the driving gear 7, whereby the gears 47, 48 and 49, and the shaft section 42 are continually rotated so long as the driving shaft 5 is driven, the gears 47, 48 and 49 rotating together. At the rearmost end of the shaft section 42 a pinion 50 is provided for the purpose of driving, through suitable connections to be described later in detail, the second countershaft compound gear member 41, the latter being driven from the countershaft 40 in this instance but at a different rate.

The second countershaft or compound gear member 41 includes a hub or sleeve section 55 and two gear sections 56 and 57. The larger gear 56 is disposed at the forward end of the gear member 41 and is spaced a distance rearwardly of the gear member 49 at the rear end of the countershaft 40. Preferably, the gears 49 and 56 are of the same size and are disposed on opposite sides of the shiftable gear member 29 so as to be optionally engaged, either of them, as desired, by the gear member 29 under the control of the shift fork 31. The gear 48 is arranged to be in constant mesh with the gear member 24 on the driven shaft 10, and preferably the gears 7, 47, 24 and 48 are of the helical constant mesh type.

In the structure so far described, five forward speeds or gear ratios are possible. The largest slidable gear 30 on the spline section 12 of the driven shaft may be shifted forwardly to engage the smaller gear 57 on the second countershaft or compound gear member 41. This engages the lowest forward drive. Next in order of gear reduction, the slidable gear 29 may be shifted rearwardly into mesh with the larger gear 56 on the second countershaft compound member 41 to engage second speed, and the gear 29 shifted forwardly to engage the smallest gear 49 on the first countershaft or compound gear member 40. This engages third speed. For fourth speed, the shiftable clutch hub 15 may be shifted rearwardly to engage the teeth 23 on the gear 24, thereby locking the latter to the driven shaft, the latter being driven through gears 7, 47, 48 and 24. When the slidable clutch hub 15 is shifted forwardly, so that the teeth 20 engage the teeth 22 on the driving gear 7, the driving and driven shafts 5 and 10 are connected together for direct drive or fifth speed. Reverse drive is effected by shifting the slidable gear 30 rearwardly to engage means serving as an idler gear and which will be described later.

In the transmission thus far described, there is provided six driving ratios, including five forward speeds and one reverse. In change speed transmissions of this type, the principal use of such transmissions is in trucks and the like, in which a considerable number of ratios are capable of being selected. In trucks, buses and the like, the ratios afforded by the lower speeds are not only widely spaced as to their proportions but also the gears are relatively heavy, with the result that gear shifting is rather difficult without causing excessive gear clashing, due partly to the considerable momentum of the gears and also partly due to the considerable variance in peripheral velocity of the two members which it is desired to bring into engagement. On the other hand, in the higher gear ratios, the gears are, first, smaller and, in the second place, the peripheral velocities do not vary so greatly. Moreover, in the lower driving ratios, the gear reduction between the load and the motor is so great that, should the load be arranged to react against the motor and drive the same, as when going down a hill with the vehicle transmission engaged in one of the lower ratios, the motor may be driven by the reaction of the momentum of the load at an excessive and dangerous rate, whereas the higher ratios are specifically designed to permit the use of the motor to retard the speed of the load with safety and without damage to the motor. In a transmission of this sort, we have, then, certain gear ratios in which it is desired that the momentum of the load can be resisted by the resistance of the motor acting against the load, and we also have certain gear ratios in which it is desirable to absolutely prevent the reaction of the load from being transmitted through the lower gear ratios to the motor when to do so would cause the latter to be driven at too great a speed.

The present invention is principally concerned with the provision of overrunning clutch or equivalent means, interposed between that group of gear ratios in which it is not desirable to be able to use the motor as a brake, for absolutely preventing the load from driving a motor when these lower ratios are engaged. In the type of transmission shown in Figure 1, it is impossible, by means now to be described, for the load to drive the motor in first and second forward speeds, or, in other words, when the gear member 30 is engaged with the gear 57 and when the gear 29 is engaged with the gear 56. In other words, whenever the drive is transmitted through the second countershaft or compound gear member 41, the driven shaft 10 is prevented from driving the driving shaft 5 when the motor is shut off and the momentum of the load carries the vehicle forwardly.

The means for preventing the momentum of the load from driving the motor in first and second forward speeds will now be described.

Reference is made above to the fact that the countershaft 41 is driven from the countershaft 40, the latter including the shaft section 42 which extends from the front wall 2 to the rear wall 3 of the transmission housing and is journaled therein. In order to drive the second countershaft or compound gear member 41, the pinion 50 at the rear end of the shaft section 42 is utilized, together with gear connections between the pinion 50 and the smaller gear 57 on the gear member 41. These connections include means serving as a two-part compound gear member which consists of two gear sections 65 and 66, best shown in Figure 2, and meshing, respectively, with the pinion 50 and the gear member 57 as best shown in Figure 1, and mounted for rotation on an auxiliary countershaft 68 in a boss or bracket 69 projecting inwardly from the side wall of the casing 1 as best shown in Figure 2 and arranged in laterally spaced relation with respect to the shaft section 42 and the driven shaft 10 in the manner best shown in Figure 3. The gear 65 also serves as the reverse idler and is engaged by the slidable gear 30 when the same is shifted rearwardly to engage reverse drive. The gear 66 includes a long sleeve or hub portion 70 which is mounted by two sets of bearings 71 and 72 on the fixed shaft 68, and it will also be noted from Figure 2 that the gear member 65 is rotatable on the rear end of the sleeve or hub section 70. The section 70 of the gear member 66 carries splines 75 on which a ratchet member 76 is slidable. The ratchet member is provided with ratchet teeth 77 which are adapted to engage complementarily formed ratchet teeth 78 carried at the forward face of the rotatable gear 65. A spring member 80 is biased between a retaining cup 81 and the ratchet member 76 and serves to constantly urge the latter toward the teeth 78 on the gear member 65. The spring retainer cup 81 fits against a shoulder 82 on the gear 66, whereby the cup 81 is held in place. The gear member 65 is maintained in proper axial position on the hub section 70 by means of a spring retainer ring 85 which snaps into a suitable groove 86 in which a slot 87 is provided to permit the insertion of a tool to remove the spring ring 86. Suitable lubricant bores 89 and 90 are provided to secure the proper lubrication of the parts of the overrunning clutch unit 64.

From the above description it will be apparent that, if the gear 30 is meshed with the gear 57 or if the gear 29 is meshed with the gear 56, when the motor is used in driving the vehicle the drive is transmitted from the driving shaft 5 through the gear 47 and the shaft section 42 to the pinion 50. The pinion 50 then drives the gear 65 in the direction of the arrows in Figures 1 and 3. The inclination of the ratchet teeth 77 and 78 is such that this drive is transmitted through the ratchet member 76 to the splines 75, so that the gear 66 is driven by the power of the motor, and this gear, in turn, serves to drive the second countershaft or compound gear member 41 in the same direction as the first countershaft 40 is driven but at a different rate, depending upon the proportion of the gears 50, 65, 66 and 57. Should, however, the speed of the vehicle tend to drive the motor faster than it would otherwise rotate, as when the motor is throttled down with the vehicle still in motion, the countershaft 42 and gear 65 would tend to slow up, but the driven shaft 10 and whichever one of the gears 29 or 30 is in mesh with the associated gears 56 and 57 tend to drive the gear 66 faster, in the direction of the arrows in Figures 1 and 2, than the gear 65. Under this condition, the member 76 ratchets over the teeth 78 on the gear 65, the spring 80 yielding to permit this action, whereby the overrunning clutch unit 64 serves to prevent the transmission of the momentum of the vehicle to the motor whenever first or second speed forward is engaged.

It is to be noted that the action of the ratchet member 76 is entirely automatic and entirely independent of any control by the operator. The unit 64, then, stands ready at all times to prevent the transmission of the momentum of the load to the motor when the selected gear ratios are such that to drive the motor by the vehicle would be undesirable. In the higher ratios, such as third, fourth and fifth speed forward, the drive is conventional and the momentum of the load could be safely imposed upon the motor so as to utilize the latter as a brake in retarding the speed of the vehicle.

Referring now to Figure 4, the transmission shown in this figure has been designed along conventional lines and embodies a transmission housing 100 in the forward wall of which is journaled a driving shaft 105 having a driving gear 107 in which is piloted the forward end of a driven shaft 108 having splined sections 109 and 110. On the forward section 109 a shiftable clutch hub 112 is mounted and in its forward position is engageable with the driving gear 107 to connect the driving and driven shafts 105 and 108 together for direct drive. When the shiftable clutch hub 112 is moved rearwardly it engages a gear member 114 journaled by bearing means 115 on a bushing or sleeve 116 which is mounted on the splined section 109. The gear member 114 is thus freely rotatable on the driven shaft 108 except when it is secured thereto by the rearward movement of the shiftable clutch hub 112.

As in the modification of the invention shown in Figure 1, the transmission shown in Figure 4 embodies two countershafts, each in the form of what might be termed a compound gear member, connected together, preferably one to be driven by the other, by suitable overrunning clutch mechanism. As also illustrated in Figure 1, one of these countershafts or compound gear members is driven from the driving gear. In the form of the invention shown in Figure 4, the countershaft or compound gear member 119 includes a rotatable sleeve 120 to which is secured three gears 121, 122 and 123, and preferably the gears 121 and 122 are spaced apart by means of a ring 124, the gears being keyed to the sleeve 120 so as to rotate therewith. The gear 121 is in constant mesh with and driven by the driving gear 107, and the gear 122 is in constant mesh with the rotatable gear 114 supported on the driven shaft 108. Thus, as stated above, when the shiftable hub member 112 is moved forwardly the driving and driven shafts 105 and 108 are connected directly together to establish fifth speed or direct drive, and when the shiftable hub member 112 is moved rearwardly to lock the rotatable gear member 114 to the driven shaft 108, the drive is transmitted from the driving gear 107 through the gears 121 and 122 to the gear member 114 on the driven shaft. This establishes fourth speed forward.

The countershaft member 119 is rotatably supported upon a shaft 127 which is supported at its forward end by bearing means 128 and at its rear end by bearing means 129 in the front and rear walls of the transmission housing 100. The forward section of the shaft 127 is smooth so as to rotatably receive the sleeve 120, and the rear end of the countershaft 127 includes means serving as a second compound gear member 130 having gear sections 131 and 132, and a rear pinion 133. Slidably mounted on the rear splined section 110 of the driven shaft 108 are two gear members 136 and 137, the former having a smaller gear section 139 engageable with the gear 123 when the member 136 is shifted forwardly, and when the gear member 136 is shifted rearwardly, the larger section 140 thereof engages with the gear section 131 forming a part of the second countershaft means 130. The other slidable gear 137 on the driven shaft is movable forwardly so as to engage the smaller gear section 132, and when the gear 137 is shifted rearwardly it engages a reverse idler 141 which is driven by the pinion 133 in the usual manner.

In the form of the invention shown in Figure 4, the second countershaft 130 is driven from the first countershaft 120 by an overrunning clutch mechanism indicated in its entirety by the reference numeral 145 and disposed at the rear end of the countershaft or compound gear member 119. The overrunning clutch device 145 consists of a ratchet ring 150 keyed to the shaft 127 and the compound gear 130 to rotate therewith and having ratchet teeth 151 engageable with corresponding ratchet teeth 152 carried on a ratchet ring member 154 which is provided with splines 156 engageable with the splines 157 formed on the rear end of the sleeve 120. A spring 160 is biased between a flange or shoulder 161 formed on the sleeve 120 and the ratchet ring 154 so as to continually urge the latter toward engagement with the teeth 151 carried on the member 150.

The teeth 151 and 152 are so arranged that when the drive is transmitted from the driving gear 107 to the first countershaft or compound gear means 119 to rotate the latter in the direction of the arrows shown in Figure 4, the overrunning clutch mechanism 145 serves to rotate the compound gear by second countershaft 130 and the shaft section 127 which forms a part thereof. If, therefore, the gear member 140 engages the gear 131, or if the gear member 137 engages either the small gear 132 or the reverse idler 141, the vehicle will be driven in either reverse, first or second speed forwardly. However, when any of these gear ratios are selected, and if the momentum of the vehicle tends to drive the same faster than it would be driven by the motor, the second countershaft means 130 will overrun the ratchet ring 154 splined onto the sleeve 120 which is driven from the driving gear 107. It will be noted that the inclination of the ratchet teeth 151 and 152 is such as to provide for this arrangement. Therefore, under these conditions, the overrunning clutch mechanism 145 positively prevents the motor from being subjected to the momentum of the load and from being driven thereby at an excessive rate when either reverse or first or second speeds forward is selected. However, if either third, fourth or fifth speed forward is selected, the motor is available to be used to retard the speed of the vehicle, for the momentum of the load is transmitted backwardly to the motor through the first countershaft means 119.

Figure 5:
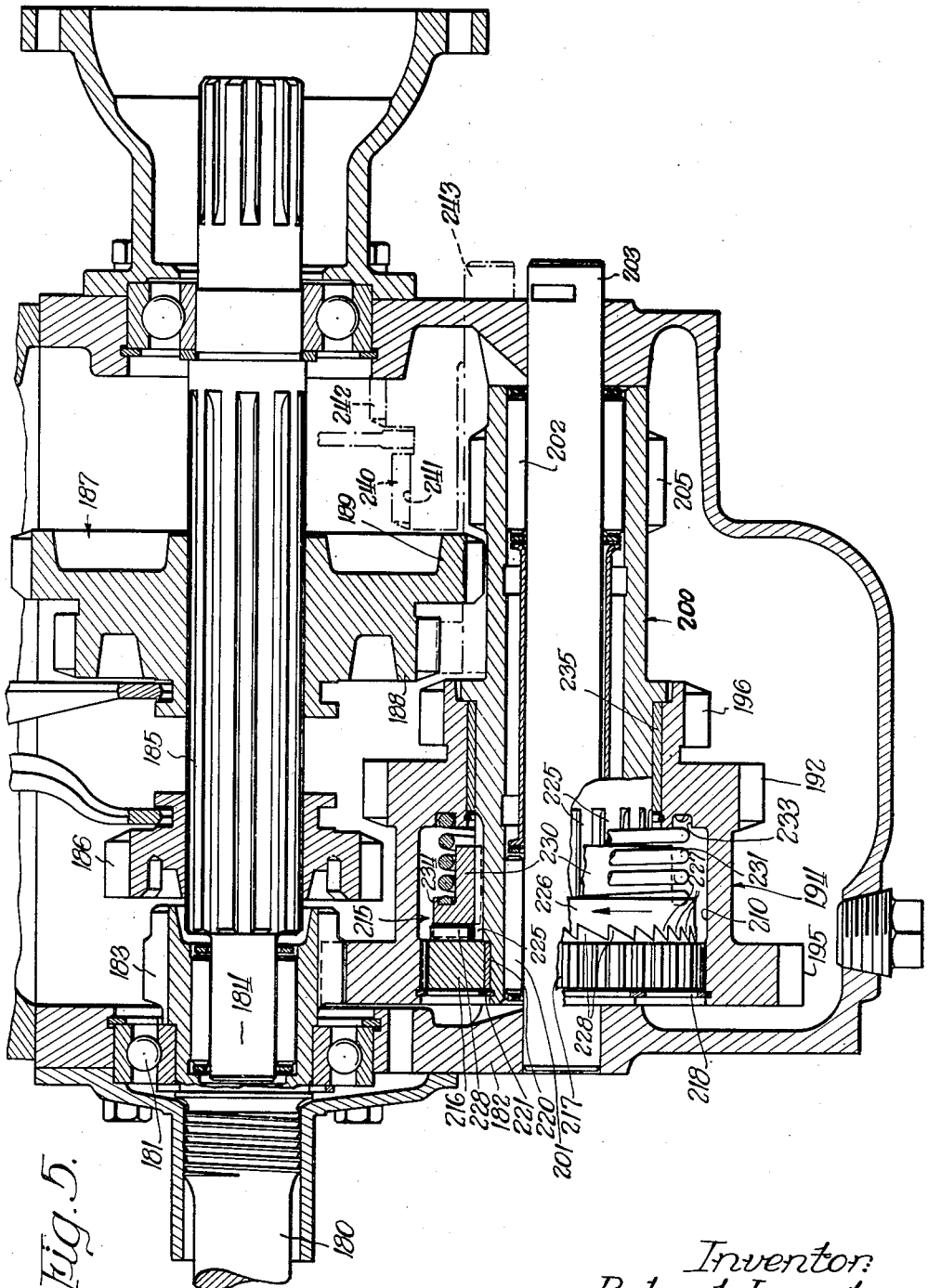
Figure 5 is a sectional view illustrating the conventional four speed forward transmission in which the low speed and reverse have been arranged with an overrunning clutch device associated therewith to prevent the momentum of the vehicle from driving the motor when either of these gear ratios are engaged.

In the modification just described and illustrated in Figure 4, the overrunning clutch device was operative, whenever either reverse, first or second speed forward was selected, to absolutely prevent the motor from being subjected to the momentum of the load, but the arrangements were such that when either third, fourth or fifth speed forward was selected, the motor was available to be used to retard the speed of the vehicle. In Figure 5 I have shown a conventional type of four speed forward transmission in which an overrunning clutch device or the equivalent is arranged to prevent the momentum of the vehicle from driving the motor only in reverse and low speed forward, the motor being available in second, third and fourth speeds to be used as a brake.

Referring now to Figure 5, the driving shaft 180 is carried by bearing means 181 in the front wall of a transmission housing 182 and is provided with a driving gear 183 in which the forward end 184 of a splined driven shaft 185 is piloted. The splined section of the driven shaft 185 carries two shiftable gears 186 and 187, the latter including two gear portions 188 and 189. The gear 186 is shiftable forwardly to engage the driving gear 183 to effect direct drive for fourth speed forward, and when the gear 186 is shifted rearwardly it engages a gear section 192 carried by a countershaft or compound gear member 194, and the member 194 includes two other gear sections 195 and 196. The gear section 195 is in constant mesh with the driving gear 183 and forms the means whereby the first countershaft or compound gear member 194 is driven.

The member 194 is supported for rotation on a tubular countershaft 200 which, in turn, is journaled by bearing means 201 and 202 on a fixed supporting shaft 203 carried by the transmission housing 182. The tubular countershaft 200 carries at its rear end a pinion 205 with which the large gear section 189 is adapted to mesh to establish a low speed or first speed forward, and the smaller gear section 188 of the gear member 187, when shifted forwardly, is adapted to mesh with the gear 196 carried at the smaller end of the first countershaft or compound gear member 194 to establish second speed forward. Third speed forward is established by the rearward movement of the gear 186 into mesh with the intermediate gear section 192 of the first countershaft or compound gear member 194.

In this modification, as in the previously described modifications, wherein two countershaft means are provided, the arrangement is such that one of the countershaft means is driven from the driving gear of the transmission, while the other countershaft means is driven from the first countershaft means by an overrunning clutch device, thereby providing for the selection of the gear ratios established through the first countershaft and in which the motor is available to be used as a brake, at the same time providing for the selection of the gear ratios controlled by the second countershaft in which the momentum of the vehicle is prevented from being transmitted to the motor, thereby protecting the latter. The transmission shown in Figure 5 is of the same general arrangement, and to this end, the first countershaft or compound gear member is provided with a relatively large diameter recess 210 in which the overrunning clutch device is disposed and which serves to connect the two countershafts 194 and 200 together.

The overrunning clutch device is indicated in its entirety by the reference numeral 215 and includes a ring member 216 having external splines 217 by which it rotates with the compound gear or countershaft member 194. The ring member 216 is held in place in substantially coplanar relationship with respect to the gear section 195 by means of a spring ring 218 and has journaled support on the forward end of the tubular countershaft 200 by bushing means 220 held in place by a spring 221. Just to the rear of the ring member 216, the tubular countershaft 200 carries splines 225 upon which a ratchet member 226 is slidably mounted. The ratchet member 226 carries ratchet teeth 227 facing forwardly and engageable with corresponding ratchet teeth 228 carried on the rear face of the ring member 216 which, it will be remembered, rotates with the first countershaft or compound gear member 194, and by virtue of the splines 225 and corresponding splines carried on the hub section 230 of the ratchet member 226, the latter rotates with the tubular countershaft 200. A spring 231 encircles the hub section 230 and bears against the flange of the member 226 at one end and against the bottom of the recess 210 in the countershaft member 194 so as to continually urge the ratchet member 226 toward engagement with the ratchet teeth 228 carried by the ring member 216. If desired, a groove 233 may be provided to receive the rear end of the spring 231, and likewise a flange 234 may be formed on the ratchet member 226 to retain the spring 231 in proper position. The rear end of the countershaft member 194 is provided with bushing means 235, and by the bushings 220 and 235 the first countershaft member 194 is supported for rotation on the second countershaft member 200.

The transmission shown in Figure 5 may be provided with any form of reversing mechanism, but preferably I employ a shiftable compound gear member 240 employing two gear sections 241 and 242 and shiftably mounted upon a fixed shaft 243 and arranged so that, when shifted forwardly, the gear section 241 engages with the large gear 187 and the gear section 242 engages with the pinion or gear 205 on the rear end of the tubular countershaft 200.

Normally, the rotation of the driving shaft 180 by the vehicle motor causes the ratchet member 213 to be rotated in the direction of the arrow superimposed thereon in Figure 5. It will be noted that the ratchet teeth 228 are of such inclination that the rotation of the member 216 in this direction causes the companion ratchet member 226 to also be driven in this direction and, since the member 226 is splined onto the tubular countershaft 200, the latter will be driven in the direction indicated by the first countershaft member 194 through the overrunning clutch device 215. As explained above, the tubular countershaft 200 serves to transmit the drive to the driven shaft 285 when either reverse or first speed forward is engaged. Hence, when these gear ratios are engaged, the momentum of the vehicle will not be imposed on the motor because, if the tubular shaft 200 and the ratchet member 226 tend to rotate faster than the ring member 216 is driven, the ratchet teeth 227 and 228 will separate, against the tension of the spring 231, and allow the ratchet 226 to overrun the ring member 216 driven by the gear 195. However, when second, third or fourth speed forward is engaged, the momentum of the vehicle may be imposed upon the motor, and hence the latter can, in these ratios, be used to retard the speed of the vehicle, but this is prevented by the overrunning clutch device when, and only when, reverse and first speed forward are engaged.

Thus, in all of the forms of the invention so far described, the various gear ratios which are available to be selected are, in effect, divided into two groups, and one means for so dividing these available ratios is by the provision of two countershafts, one transmitting the drive to one group of ratios and the other transmitting the drive to the other group, and one group of ratios being those in which it is desired to have the motor capable of being used as a brake, and the other group being those ratios in which it is desired to prevent the motor from being subjected to the momentum of the vehicle at those particular gear reductions.

Figure 6 shows another modified form of transmission embodying the principles of the present invention, but differing principally from the forms described above in that, where previously the constructions were such that one of the countershafts is driven by the other countershaft, in Figure 6 both of the two countershafts are driven from the driving shaft connected with the motor. Referring now to Figure 6, it will be noted that the transmission there shown is of the type disclosed and claimed in my Patent 2,017,906 granted Oct. 22, 1935, and embodies a driving shaft 250 supported by bearing means 251 in the front wall 252 of a transmission housing 253 and carrying a driving gear 254 on the rear side.

of the front wall 252 and a splined section 255 on which is mounted a second driving gear 256 on the forward side of the front wall 252 of the transmission housing. The housing 253 is also provided with a driven shaft 260 having two splined sections 261 and 262, and on the former a shiftable clutch hub member 264 is slidably mounted. The member 264 carries teeth 265 engageable with internal teeth of the driving gear member 254, and the member 264 also carries a set of teeth 266 which are engageable with the internal teeth on the rotatable gear 268 journaled by bearing means 269 on the driven shaft 260 between the splined sections 261 and 262.

One of the countershafts is driven from the driving gear 254 and the other of the countershafts is driven from the driving gear 256. The first countershaft is in the form of a compound gear member 270 having gear sections 271, 272 and 273, the section 271 being in mesh with the driving gear 254. The second countershaft is indicated by the reference numeral 277 and is journaled by bearing means 278 and 279 in the front and rear walls of the transmission casing 253. The first countershaft or compound gear member 270 is journaled for rotation on the forward portion of the second countershaft 277 by suitable bearings 280 and 281, and the forwardmost end of the second countershaft 277 is splined as indicated at 284 and carries a hub of an overrunning clutch device indicated in its entirety by the reference numeral 286 and which includes a gear member 287 meshing with the driving gear 256. While the details of the overrunning clutch device 286 do not per se form any part of the present invention, one type of overrunning clutch which may be used is indicated in Figure 7 which illustrates the overrunning clutch as including a plurality of spring connected inclined elements 290 arranged between two concentric surfaces 291 and 292 in which one can drive the other in only one direction. In other words, the gear member 287 will rotate the hub 284 in a counter-clockwise direction as viewed in Figure 7, but the counter-clockwise rotation of the hub 284 will not drive the gear 287 in that direction, the elements 290 permitting the hub member 284, and the countershaft 277 associated therewith, to overrun the gear 287 in a counter-clockwise direction.

The rear end of the second countershaft member 277 is provided with gear sections 297 and 298 which constitute, in effect, a compound gear 300. The rear splined section 262 of the driven shaft 260 carries a slidable gear 301 which may be meshed with either the small gear 273 on the first countershaft 270 or the large gear 297 on the compound gear 300. The splined section 262 also carries another gear member 302 which may be shifted forwardly to engage the gear section 298 or rearwardly to engage a reverse idler 305 which is, itself, in the form of a compound gear having a forward gear section 306 continually meshing with and driven by the gear 298.

When the large slidable gear 302 is engaged with the gear section 305, the transmission is arranged for reverse, and when the gear 302 is shifted forwardly into mesh with the gear section 298, the lowest or first speed forward is established. Second speed is established by the engagement of the slidable gear 301 with the gear section 297. It will be noted that reverse, first and second speeds forward are all established through the countershaft 277 which is driven through the overrunning clutch device 286. In a transmission of this character, the momentum of the vehicle is prevented, by the overrunning clutch device 286, from driving the motor whenever reverse, first or second speed forward is engaged. In third, fourth and fifth speeds forward, the gear reductions are such that the motor may be safely used as a brake and, according to the principles of the present invention, third, fourth and fifth speeds are those which are established through the first countershaft means 270 which is directly driven from the driving gear 254 and not through any overrunning clutch device.

In all of the forms which the invention may take, as described above, it is to be noted that the overrunning clutch device is a simple, sturdy and inexpensive construction, yet is entirely adequate to protect the motor by being positioned in the train of gears utilized in establishing the high gear reduction necessary for the lower speeds and in which it is highly objectionable to subject the motor to be driven by the momentum of the vehicle when such low speeds or high reduction ratio means is engaged.

While I have shown and described above the preferred constructions, it is to be understood that my invention is not to be limited to the specific details shown and described above, but that, in fact, widely different means may be employed in the practice of the broader aspects of my invention.

What I claim, therefore, and desire to secure by Letters Patent is:

1. In a transmission, a driving shaft, a driven shaft, means serving as two countershafts, means positively connecting one of said countershafts with said driving shaft for rotation therewith in both directions, selective gear reduction means associated with said one countershaft for connecting the same with said driven shaft in any one of a group of ratios, other selective gear reduction means associated with the other of said countershafts and arranged to connect said other countershaft with said driven shaft in any one of another group of ratios, and means including an overrunning clutch device for driving said other countershaft from said one countershaft and serving to prevent the driven shaft from driving the driving shaft whenever any one of said other group of ratios is selected.

2. In a transmission, a driving shaft, a driven spline shaft, change speed gears mounted thereon, a countershaft member having gear means rotatable therewith and engaged by certain of said change speed gears, means serving as a compound gear member rotatable on said countershaft member adjacent its forward end and driven from said driving shaft, said compound gear member having a gear portion adapted to be engaged by certain of said change speed gears so as to transmit the drive to said driven shaft, and means including an overrunning clutch having engageable and releasable elements arranged about the axis of said compound gear member and adapted to drive one of said members, thereby providing for the overrunning of only those of said change speed gears that are adapted to be engaged with said one member.

3. In a transmission, a driving shaft, a driven shaft, means serving as two countershafts, means connecting one of the countershafts with said driving shaft, selective gear reduction means associated with each countershaft for connecting the driving and driven shafts together in two separate groups of ratios, and means including an overrunning clutch for driving said other countershaft and the gear reduction means associated therewith from said one countershaft.

4. In a transmission, a driving shaft, a driven shaft, means serving as two countershafts, means connecting one of the countershafts with said driving shaft, selective gear reduction means associated with each countershaft for connecting the driving and driven shafts together in two separate groups of ratios, said one of the countershafts constituting a compound gear member journaled for rotation on the other countershaft, and means including an overrunning clutch for driving said other countershaft from said compound gear member.

5. In a transmission, a driving shaft, a driven shaft, means serving as two countershafts, one of said countershafts being journaled for rotation on the other, means connecting one of the countershafts with said driving shaft, selective gear reduction means associated with each countershaft for connecting the driving and driven shafts together in two separate groups of ratios, each of said selective gear reduction means including a gear member on the driven shaft and a companion gear member on the associated countershaft, and overrunning clutch means connecting the rear end of one countershaft with the other countershaft.

6. In a transmission, a driving shaft, a driven shaft, means serving as two countershafts, means connecting one of the countershafts with said driving shaft, selective gear reduction means associated with each countershaft for connecting the driving and driven shafts together in two separate groups of ratios, said one of the countershafts being journaled for rotation on the other, and overrunning clutch means connecting the rear end of said one countershaft with said other countershaft.

7. In a transmission, a driving shaft, a driven shaft, means serving as two countershafts, means connecting one of the countershafts with said driving shaft, selective gear reduction means associated with each countershaft for connecting the driving and driven shafts together in two separate groups of ratios, said one of the countershafts constituting a compound gear member journaled for rotation on the other countershaft, and means including an overrunning clutch disposed within said compound gear means and serving to connect the forward end thereof with the forward end of said other countershaft on which it is journaled.

8. In a change speed transmission, a countershaft, a compound gear member revoluble freely thereon, a pinion on the countershaft, a second countershaft carrying a gear in constant mesh with said pinion and a gear in constant mesh with said compound gear member, and an overrunning clutch operatively disposed between said gears.

9. In a transmission, a driving shaft, a driven shaft, means serving as two countershafts, selective gear reduction means associated with each countershaft for connecting the driving and driven shafts together in two separate groups of ratios, one of the countershafts constituting a compound gear member journaled for rotation on the other countershaft, and means for driving said compound gear member from said other countershaft including an auxiliary countershaft, gear means thereon driven from said other countershaft, a second gear means on said auxiliary countershaft for driving said compound gear member, and overrunning clutch means connecting said first and second gear means.

10. In a transmission, a driving shaft, a driven shaft, means serving as two countershafts, means connecting one of the countershafts with said driving shaft, selective gear reduction means associated with each countershaft for connecting the driving and driven shafts together in two separate groups of ratios, and means for driving the other countershaft from said one countershaft including a relatively fixed stub shaft, a pair of gear members journaled thereon and one connected with one countershaft and the other connected with the other countershaft, and ratchet mechanism connecting said gear members together whereby one drives the other in one direction only.

11. In a transmission having separate countershaft means controlling two groups of gear reduction ratios, means for driving one of said countershaft means from the other including a gear member meshed with one of said countershaft means and having an elongated hub section provided with splines, a second gear member disposed coaxially and rotatable with respect to said first gear member and having ratchet teeth on the side adjacent the latter, and a complementary ratchet member mounted on the splined section of said first gear member and engageable with said ratchet teeth to effect a driving connection between said gear members in one direction only.

12. In a transmission, a driving shaft, a driven shaft, means serving as two countershafts, means connecting one of the countershafts with said driving shaft, selective gear reduction means associated with each countershaft for connecting the driving and driven shafts together in two separate groups of ratios, said one of the countershafts constituting a compound gear member journaled for rotation on the other countershaft, and means including an overrunning clutch connecting one end of one of said countershafts with the adjacent portion of the other countershaft.

13. In a transmission, a driving shaft, a driven shaft, means serving as two countershafts, means connecting one of the countershafts with said driving shaft, selective gear reduction means associated with each countershaft for connecting the driving and driven shafts together in two separate groups of ratios, said one of the countershafts constituting a compound gear member journaled for rotation on the other countershaft, and means including an overrunning clutch connecting one end of said compound gear member with the adjacent portion of the other countershaft upon which said gear member is journaled for rotation.

ROBERT LAPSLEY.